June 22, 1965     J. S. PATERSON     3,189,987
METHOD OF MAKING MAGNETIC CLUTCHES AND BRAKES
Filed April 10, 1963
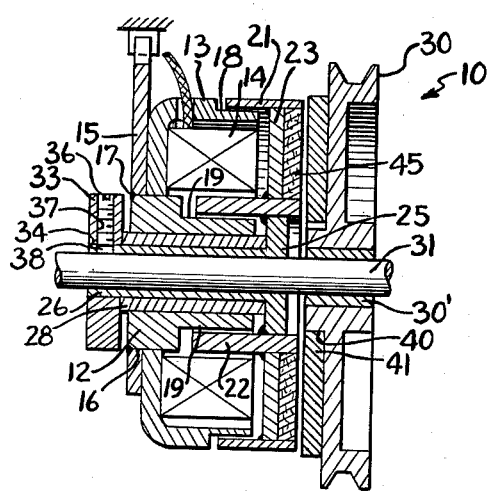
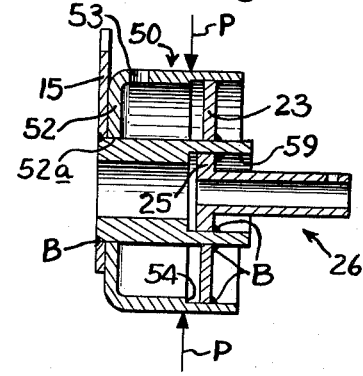
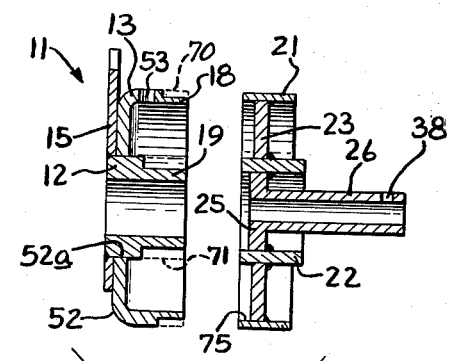
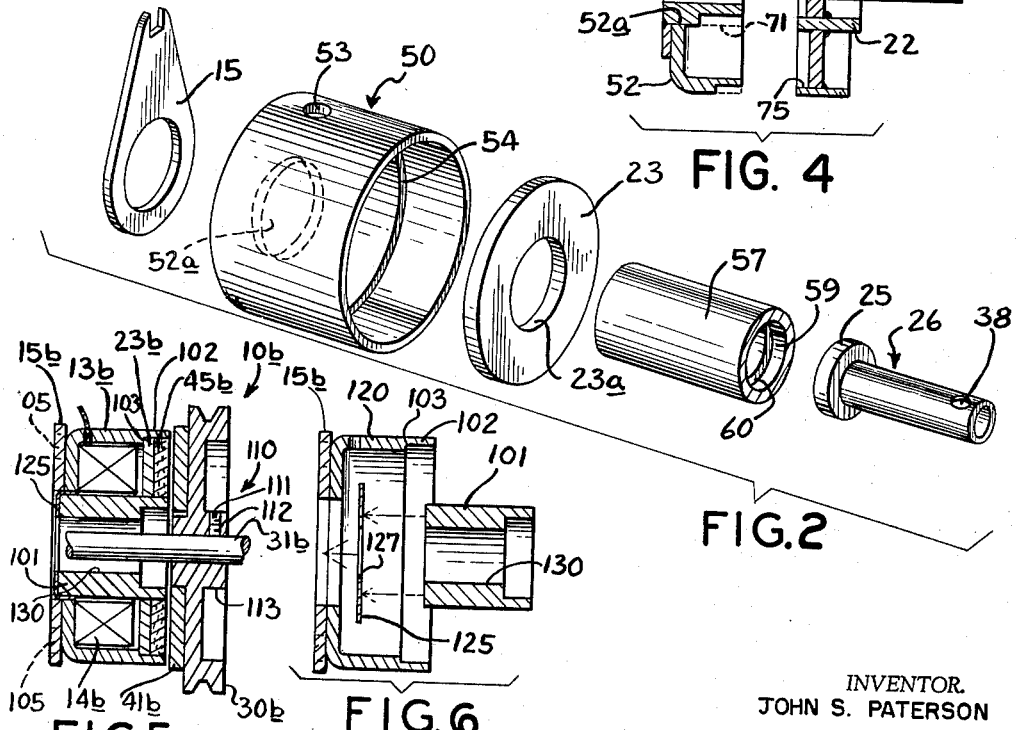
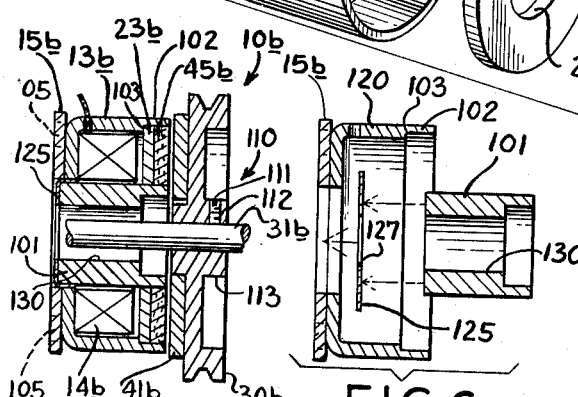
INVENTOR.
JOHN S. PATERSON
BY
*ATTORNEY*

United States Patent Office 3,189,987
Patented June 22, 1965

3,189,987
METHOD OF MAKING MAGNETIC
CLUTCHES AND BRAKES
John S. Paterson, Torrington, Conn., assignor to General
Time Corporation, New York, N.Y., a corporation of
Delaware
Filed Apr. 10, 1963, Ser. No. 271,993
7 Claims. (Cl. 29—416)

This invention relates to magnetic clutches and brakes and, more particularly, to an improved method of manufacturing such equipment.

In the production of magnetic clutches, it is a conventional manufacturing practice to fabricate a number of individual parts to particular specifications and assemble the parts one by one to form the finished product. Magnetic clutches heretofore manufactured were commonly constructed on a part-by-part basis into assembled units, which units were then joined to form the final product. One unit served as the stationary member, the other as the rotary member. Because of required close tolerance interfitting of parts, each of the members was necessarily subjected to time-consuming special machine operations which required individual tooling for each of the members. Magnetic brakes would be formed in a like manner and without, in most instances, taking advantage of certain structural similarities between the two. As a result of such practices, stock requirements are necessarily high, in that a relatively large number of individual parts are required. Also, fabrication and assembly time is costly, both as to machining and manpower.

It is an object of the present invention to provide a method of mass producing high quality magnetic clutches and brakes in a more efficient manner than previously known or employed. More specifically, it is an object of this invention to provide a novel method of manufacturing both clutches and brakes of the magnetic type from standardized preassembled basic parts and by standardized operations, requiring a minimum of individual fabrication and individual assembly of the several parts, while insuring accuracy of alignment.

It is a further object of the invention to permit the offering of unusually low cost, highly efficient, magnetic clutches and brakes, of the type described, by minimizing the number of different parts required to be individually fabricated and stocked, and, in a like manner, reducing the amount and cost of tooling to manufacture and assemble such devices.

It is another object, in conjunction with the foregoing, to achieve a manufacturing advantage by providing for the production of both magnetic brakes and clutches with like fabricating techniques and with the same, relatively small group of standard parts and manufacturing tools and equipment.

For a fuller understanding of the nature and objects of the invention, reference should be had to the following detailed description taken in connection with the accompanying drawings, in which:

FIGURE 1 is an axial section of a clutch made by my improved method;

FIG. 2 is an exploded perspective view of the several basic parts which are initially assembled during the manufacture of the clutch;

FIG. 3 is an axial section of the parts shown in FIG. 2, after initial assembly;

FIG. 4 is a view similar to FIG. 3, but illustrates further steps in the manufacturing operation;

FIG. 5 is similar to FIG. 1, but illustrates an assembled brake; and

FIG. 6 is a partially exploded view showing certain of the elements of FIG. 5 before assembly.

While the invention is susceptible of various modifications and alternative constructions, certain illustrative embodiments have been shown in the drawing and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Similar reference characters refer to similar parts throughout the several views of the drawing.

Referring particularly to FIG. 1, it will be helpful in understanding the present invention to briefly examine the structure of an exemplary clutch 10 made in accordance therewith. The clutch 10 comprises a stationary pole member 11 consisting of an inner sleeve 12 and outer cup 13, together defining a housing for a coil 14. The coil 14 surrounds the sleeve 12 within the cup and may be conveniently secured in the cup by potting with epoxy resin. In the exemplary clutch shown, the sleeve 12 and cup 13 serve as stationary poles and an anchoring arm 15 is attached, as by brazing, to an enlarged diameter portion 16 of the sleeve 12 which projects, as illustrated, through an opening in the left-hand end of the cup 13, the arm 15 being slotted for conveient keying to a desired stationary object.

Since the sleeve 12 has an enelarged portion 16, it also has a reduced diameter portion, shown at 19, so that sleeve 12 has a stepped cross section. In a like manner, the rim of the cup 13 is formed with a reduced external diameter portion, shown at 18. The cup and sleeve are formed in this manner in order to simultaneously cooperate with a single rotary unit of the clutch. Accordingly, the reduced portions 18 and 19 are respectively telescoped within a pair of concentric rotary pole pieces 21 and 22 constructed of a ferromagnetic material, which are spaced in their operative positions about the coil 14, in fixed relation, by an annular disc 23 formed of a suitable nonmagnetic material, such as stainless steel. The inner pole piece 22 is secured, as by brazing to a flange 25 disposed at the right-hand end of a rotary sleeve 26 which is mounted within the sleeve 12, the left-hand end of sleeve 26, as illustrated, extending beyond the left-hand ends of the sleeve 12 and the attached anchoring arm 15.

As may be seen, the outer diameter of the rotary sleeve 26 is slightly smaller than the bore of the sleeve 12 so as to provide adequate space for a bearing sleeve 28 formed of bronze, or other suitable material, which may be press fitted into sleeve 12 to reduce friction between the inner sleeve and the rotary sleeve. A shaft 13 is provided which extends through the rotary sleeve 26 and is secured to the sleeve by means of collar 33 adapted to seat on the left-hand end 34 of the sleeve 26. The shaft and the sleeve are joined by means of a setscrew 36 mounted in a threaded aperture 37 in the collar which is aligned with a hole 38 in the sleeve 26 and is tightened against the shaft 31 for preventing relative rotation therebetween.

The remaining rotary portion of the clutch is in the form of a sheave 30 secured to a bearing 30' which is arranged adjacent the pole pieces 21 and 22, the bearing being fitted on the shaft 31 so as to permit the sheave to rotate relative thereto. The sheave is flanged at its back or left-hand face, as shown at 40, and a ferromagnetic annular armature ring 41 is fitted over the flange, against the back of the sheave facing the rotary pole pieces 21 and 22, and the spacing disc 23. In order to facilitate engagement with the armature ring 41, the face of the ring 23 is provided with friction material, as shown at 45.

In accordance with the present invention a small number of basic parts are preassembled into a single rigid assembly which is then severed transversely to the axis thereof to provide the rotor and stator members for the magnetic clutch of the type described. More particularly, in carrying out the invention, an assembly is provided having a cylindrical wall which has a body portion and an end portion of reduced radial thickness with a "step" therebetween, the assembly being severed at the step and the body portion being annularly relieved to permit overlapping engagement of the two subassemblies thus formed.

The method will be understood in detail with reference to FIGS. 2, 3, and 4 of the patent drawing. In FIG. 2, there are shown certain prefabricated parts which are fitted and secured together to form the initial assembly. Such parts, in the present instance, include a cup-shaped member 50, having an end wall or base 52 in which is formed a central opening 52a. A hole 53 is provided adjacent the base to permit passage of the electrical leads to the coil. As apparent in FIGS. 2 and 3, the right-hand end portion of the cup member is internally relieved so as to be of reduced radial thickness and so as to define a step 54. An annular disc 23, corresponding to the annular disc 23 in FIG. 1 and having an opening 23a therein, is positioned within the right-hand end portion of the cup and preferably forms a press fit with the inner surface thereof. For the purpose of forming cooperating pairs of small diameter pole pieces, a tubular member 57 is provided, the right-hand end portion thereof also being relieved to produce a portion 59 of reduced radial thickness which terminates in a step 60 and the member 57 being dimensioned to provide a snug fit within the opening 52a in the base and the opening 23a in the annular member 23. Telescoped within the tubular member 57 is a rotary sleeve 26, corresponding to the rotary sleeve 26 in FIG. 1 and having a flange 25 at one end, dimensioned to provide a snug fit with the member 57. Completing the assembly is an arm 15, corresponding to the arm 15 in FIG. 1, which fits over the projecting end portion of the tubular member 57, as shown.

It will be apparent that a jig may be used to insure that the parts are telescoped so as to have a precise coaxial relationship and so as to have proper relative spacing therebetween, i.e., one part being at a predetermined depth with respect to another. More specifically, the annular disc 23 is pressed into the cup only about midway along the relieved portion thereof and the flange 25 on the rotary sleeve 26 is pressed into tubular member 57 short of the step 60 in the latter. Further, in carrying out the present invention, the steps or shoulders 54 and 60 on the cup and tubular member, respectively, are positioned in axial alignment. After the parts have been fitted together, as shown in FIG. 3, the joints may be suitably brazed, using well-known techniques, at a temperature which is sufficiently low so as to prevent warpage or change in dimensions of the assembly. It should be noted that the invention is not limited to a press fit between the elements, but rather the elements may be brazed together while held in the desired relation without departing from the invention. Conversely, if a substantially tight press fit is provided, the brazing may be dispensed with.

Having provided the preliminary assembly, as described above, a single strategic cutting operation is performed which results in the formation of the basic stationary and movable portions or subassemblies of the clutch. Thus, the preliminary assembly may be severed by a suitable saw or cutter in the plane of the arrows "P" in FIG. 3, so that two subassemblies are provided, as illustrated in FIG. 4.

The left-hand portion in FIG. 4 immediately becomes recognizable as the stationary pole member 11 of the clutch 10 in FIG. 1, the portion of the cup-shaped member included therein corresponding to the cup 13 and the portion of the member 57 included therein corresponding to the sleeve 12. To complete the stationary portion, one need only remove sufficient metal from the cup 13 and sleeve 12, as indicated at 70 and 71, to provide the respective stepped portions 18 and 19 and assemble the coil 14 within the cup, passing the coil leads through the hole 53 therein. The basic rotary portion of the clutch has likewise been formed and now appears on the right, as seen in FIG. 4, this portion being reversed from that illustrated in FIG. 1. The sleeve 26 has become the inner shaft receiving member, the severed portion of the member 57 forms the inner rotary pole piece 22, and the severed portion of the cup 50 forms the outer rotary pole piece 21.

The clutch is assembled by reversing the right-hand portion in FIG. 4 and inserting the sleeve 26 into the sleeve 12, a bearing corresponding to bearing 28 in FIG. 1 being interposed between sleeves 12 and 26 during this inserting operation. The annular disc 23 is then faced with friction material, such as that indicated at 45 in FIG. 1, which is pressed into the annular space 75 (FIG. 4) formed as a result of the present method of manufacture. The sheave 30 and the shaft 31 are standard items to be assembled for completing the unit.

In accordance with another aspect of the invention, magnetic brakes are manufactured in a manner which will complement the above-described manufacture of clutches. In keeping with this aspect of the invention, certain basic clutch parts and manufacturing techniques are likewise used in the production of magnetic brakes, such as that shown, by way of example, in FIG. 5. In describing the brake, similarity of construction with the clutch of FIG. 1 will be accentuated by use of designating numerals corresponding to like parts found in the FIG. 1 clutch construction, with the adscript "b" thereafter. New parts will, of course, receive a new designation.

Accordingly, an exemplary magnetic brake 10b is illustrated having a stationary cupped housing 13b which houses a coil 14b. Because the main body of the brake does not employ rotary parts, as does the above-described clutch, certain parts, such as the inner sleeve 26, the bearing 28, and the rotating pole pieces 21 and 22, are replaced or eliminated, depending upon what relation they have in the operation of the new device.

In the present instance, then, an inner sleeve 101 is provided which serves as an inner stationary pole piece, sleeve 101 supplanting sleeve 12 and rotary pole piece 22 of the clutch. In a like manner, the cup 13b is formed with an end portion 102 having an enlarged inner diameter, so that the interior diameter of the cup 13b decreases in stepped fashion, as seen at 103 in FIG. 5. The end portion 102 serves as a stationary outer pole piece, supplanting the rotary pole piece 21 of the clutch.

For the purpose of closing the right-hand end of the cup 13b, as illustrated in FIG. 5, so as to completely encase the coil 14b, a disc 23b having a central aperture is provided, the aperture fitting over the end of the sleeve 101 and the disc 23b fitting within the end portion 102 of the cup 13b. The disc 23b is abutted against the step 103 and a friction coating 45b is applied to the disc. Turning briefly to the anchoring of the brake, an anchoring arm 15b is provided which fits on the extended portion of piece 101 in comparable fashion to that of the clutch of FIG. 1. Additional holes 105 are conveniently provided in the arm 15b for additional support of the brake against severe braking torques and as with the clutch, the coil 14b may be secured in the cup by epoxy resin.

The brake 10b further includes a rotary portion 110 which is positioned for rotation relative to the stationary portion and adapted to be "stalled" or stopped by energizing the coil 14b. The rotary portion 110 may be of simple construction having a sheave or pulley 30b mounted on a shaft 31b and secured thereto by a setscrew 111 screwed into a transverse hole 112 in the hub 113 of the sheave or pulley. An armature ring 41b is mounted in any suitable fashion to the rear or left-hand face of the pulley, as illustrated.

In keeping with the invention, the brake of FIG. 5 is efficiently fabricated and produced by an improved method similar to that previously described with respect to the clutch, and, in certain instances, use may be made of the same or like basic parts. FIG. 6 illustrates a method of manufacture which is embodied by the invention. Referring thereto, a cupped member 120, which may be the same, or similar to member 50 of FIG. 2, is provided having an anchor arm 15b secured thereto and having a sleeve 101, similar to sleeve 57 of the clutch press fitted in place.

In accordance with an additional feature of the invention, a nonmagnetic disc 125, having an aperture 127 therein which approximates the bore 130 of the sleeve 101, is interposed between the sleeve 101 and the cupped member 120 and has sufficient thickness (approximately 0.012″) to provide an appropriate "air gap" so that flux intensity and decay following de-energization of the coil 14b are controlled and, thus, undesired residual braking is inhibited. By pressing the simple disc into the assembly concurrently with sleeve 101, the desired gap is automatically achieved, as illustrated in FIG. 5.

Thus, from the preceding description, it will be seen that the present invention provides a simple, yet highly efficient, method of manufacturing magnetic clutches and the like which are as strong and durable as individually fabricate devices, which costing considerably less to manufacture.

I claim as my invention:

1. The method of manufacturing magnetic torque transmitting clutches, or the like, having cooperating stationary and rotary members, comprising the steps of press fitting a tubular member having a bore into a circular opening in a cupped member such that the cup is coaxial and radially spaced from said tubular member, press fitting a nonmagnetic annular member between said tubular member and said cup, press fitting a flanged tube into the bore of said tubular member so that the flange and the annular member are disposed in substantially the same plane, physically severing the assembly so formed along a transverse plane intermediate the annular member and the end of the cup into two subassemblies, forming at least one of said subassemblies to receive the other in telescoping relation, placing an annular coil within one of said subassemblies, reassembling the subassemblies into an operative assembly so that one of said subassemblies is rotatable relative to the other, and fixing a power receiving driving member to one of said subassemblies to complete the clutch.

2. A method of manufacturing magnetic torque transmitting clutches, or the like, having cooperating stationary and rotary members, comprising the steps of press fitting a tubular member having a bore and having a stepped inner wall into a circular opening in a cupped member having a stepped inner wall such that the cup is coaxial and radially spaced from said tubular member and such that the stepped portions thereof are axially aligned, press fitting a nonmagnetic annular member between said tubular member and said cup, press fitting a flanged tube into the bore of said tubular member so that the flange and the annular member are disposed adjacent the plane of the stepped portions, physically severing the assembly so formed along the plane of the stepped portions so that subassemblies are formed, reducing the cross-sectional width of portions of one of said subassemblies, placing an annular coil within one of said subassemblies, assembling the subassemblies in telescoping relation into an operative assembly so that one of said subassemblies is rotatable relative to the other, and fixing a power receiving driving member to one of said subassemblies to complete the clutch.

3. A method of manufacturing magnetic torque transmitting clutches, or the like, having cooperating stationary and rotary members, comprising the steps of press fitting a tubular member having a bore partially through a circular opening in a cupped end of a larger diameter member such that the larger diameter member is coaxial and radially spaced from said tubular member, press fitting an anchoring device onto the portion of the tubular member protruding through the circular opening in the cupped end of the larger diameter member, press fitting a nonmagnetic annular member between said tubular member and the larger diameter member, press fitting a flanged tube into the bore of said tubular member so that the flange and the annular member are disposed in substantially the same plane, physically severing the assembly so formed along a transverse plane intermediate the annular member and the cupped end of the larger diameter member into two separate subassemblies, reducing the cross-sectional widths of portions of one of said subassemblies to receive the other in telescoping relation, placing an annular coil within one of said subassemblies, reassembling the subassemblies into an operative assembly so that one of said subassemblies is rotatable relative to the other, and fixing a power receiving driving member to one of said subassemblies to complete the clutch.

4. A method of manufacturing magnetic torque transmitting clutches, or the like, having cooperating stationary and rotary members, comprising the steps of providing a small number of base parts, interfitting said parts to form an assembly, physically severing said assembly in a plane transverse to the axis thereof to provide two subassemblies, positioning a coil within one of said subassemblies, modifying one subassembly to receive the other subassembly in telescoping relation, and reassembling said subassemblies to form relatively rotatable subassemblies of a magnetic clutch.

5. A method of manufacturing magnetic torque transmitting clutches, or the like, having cooperating stationary and rotary members, comprising the steps of fastening a tubular member having an axial bore into a cupped member such that the cup is coaxial and radially spaced from said tubular member, fastening an annular member between said tubular member and said cup, fastening a flanged tube into the bore with a portion thereof protruding from said tubular member so that the flange and the annular member are disposed in substantially the same plane, fastening anchoring means on said protruding portion of said flanged tube, physically severing the assembly so formed along a transverse plane intermediate the annular member and the cup into two separate subassemblies, forming one of said nuts to receive the other in telescoping relation, placing an annular coil within one of said subassemblies, assembling the subassemblies into an operative assembly so that one of said subassemblies is rotatable relative to the other, and fixing a power receiving driving member to one of said subassemblies to complete the clutch.

6. A method of manufacturing magnetic brakes, or the like, comprising the steps of providing a small number of base parts, including a first tubular member having a cupped end with an axial hole formed therein and a stepped inner wall, a second tubular member having a bore and having a stepped inner wall, and a disc having a diameter greater than the axial hole in the cupped end of the first tubular member, interfitting said parts to form a subassembly by placing said disc between the cupped end of the first tubular member and said second tubular member and pressing the latter partially into the hole in the cupped end, placing an electrical coil over said second tubular member and press fitting an annular ring of nonmagnetic material between the first and second tubular members in a plane transverse to the axis thereof, and facing said annular ring with friction material to complete said brake.

7. In a method of manufacturing a magnetic torque transmitting clutch, the steps comprising the making of a rigid assembly formed of a cup member and a tubular member centered therein with a portion of the cup being relieved to form a portion of reduced radial thickness and a step with a disc being interposed between such portion of reduced radial thickness and said tubular member, severing the cup and tubular member along a plane generally aligned with said step, positioning a coil within one of the several parts, annularly relieving the cup and the tubular member for telescoping engagement between the severed parts and reassembling the severed parts in telescoping engagement to form relatively rotatable parts of a magnetic clutch.

References Cited by the Examiner
UNITED STATES PATENTS

| | | | |
|---|---|---|---|
| 1,552,748 | 9/25 | Kopplinger | 29—416 |
| 2,698,989 | 1/55 | Lyon | 29—416 |
| 3,085,324 | 4/63 | Nelson | 29—416 |

WHITMORE A. WILTZ, *Primary Examiner.*

THOMAS H. EAGER, *Examiner.*

UNITED STATES PATENT OFFICE
CERTIFICATE OF CORRECTION

Patent No. 3,189,987                                                         June 22, 1965

John S. Paterson

It is hereby certified that error appears in the above numbered patent requiring correction and that the said Letters Patent should read as corrected below.

Column 2, line 27, for "conveient" read -- convenient --; line 28, for "enelarged" read -- enlarged --; line 53, for "shaft 13" read -- shaft 31 --; column 6, line 51, for "nuts" read -- units --.

Signed and sealed this 31st day of January 1967.

(SEAL)
Attest:

ERNEST W. SWIDER                                          EDWARD J. BRENNER
Attesting Officer                                                    Commissioner of Patents